United States Patent [19]

McMahan

[11] 4,169,386

[45] Oct. 2, 1979

[54] AGRICULTURAL WATER PRESSURE GAUGE

[76] Inventor: Walter C. McMahan, Rte 6., Box 2115, Escondido, Calif. 92025

[21] Appl. No.: 875,992

[22] Filed: Feb. 8, 1978

[51] Int. Cl.² ............................................. G01L 7/00
[52] U.S. Cl. ........................................ 73/700; 73/215
[58] Field of Search .......................... 73/700, 756, 215

[56] References Cited

U.S. PATENT DOCUMENTS 3,882,724  5/1975  Hearn ..................................... 73/215

Primary Examiner—Anthony V. Ciarlante
Attorney, Agent, or Firm—Flam & Flam

[57] ABSTRACT

A water pressure gauge for agricultural use comprises no moving parts. A translucent tube has one end provided with a hollow prong or probe that penetrates flexible water conduit. The tube is open at the end opposite the probe and has an outlet opening located near the probe end. With the guage vertically oriented, water reaches a level in the tube dependent upon water pressure. By careful calibration of the outlet relative to an interior baffle, a reasonably satisfactory water pressure gauge is available for irrigation purposes.

9 Claims, 3 Drawing Figures

AGRICULTURAL WATER PRESSURE GAUGE

BACKGROUND OF THE INVENTION

The present invention relates to agricultural irrigation. In order to obtain optimum results, the quantity of water delivered to growing crops is carefully controlled. The amount of time that an irrigation system should be operated depends upon a variety of factors, including soil moisture condition as measured by a moisture gauge and water supply pressure. Instruments that are used in the field are ordinarily difficult to maintain in readable operating condition due to the exposure to the elements and the complex nature of certain instruments.

The primary object of the present invention is to provide a water pressure gauge for agricultural use that has no moving parts, that comprises only a few inexpensive parts, that can easily be maintained by the simplest of procedures.

SUMMARY OF INVENTION

In order to accomplish the foregoing object, I provide a translucent tube of approximately half an inch in diameter closed at one end by a fitting that provides a hollow probe capable of penetrating flexible water conduit for measurement of pressure therein. The other end of the tube is open to atmosphere. Between the probe end of the tube and an intermediate baffle, an outlet opening is provided sized so that the water rises in the tube to a level proportional to the conduit water pressure. Simple indication markings on the tube provide a reading of water pressure.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale. p

DETAILED DESCRIPTION OF PREFERRED EMBODIMENT

The following detailed description is the best presently contemplated mode of carrying out the invention. This description is not to be taken in a limiting sense, but is made merely for purposes of illustrating the general principles of the invention since the scope of the invention is best defined by the appended claims.

Figure 1:
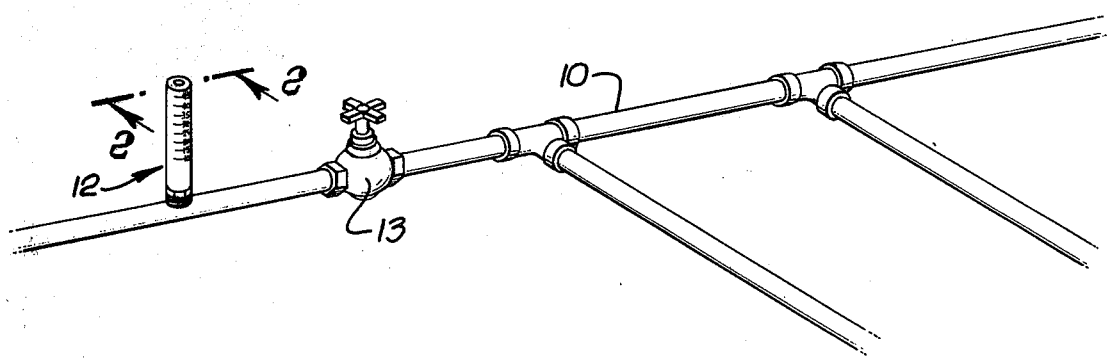
FIG. 1 is a pictorial view part of a conduit system for drip irrigation, the gauge incorporating the present invention being attached at the valve end of the main trunk supply line.
Figure 2:
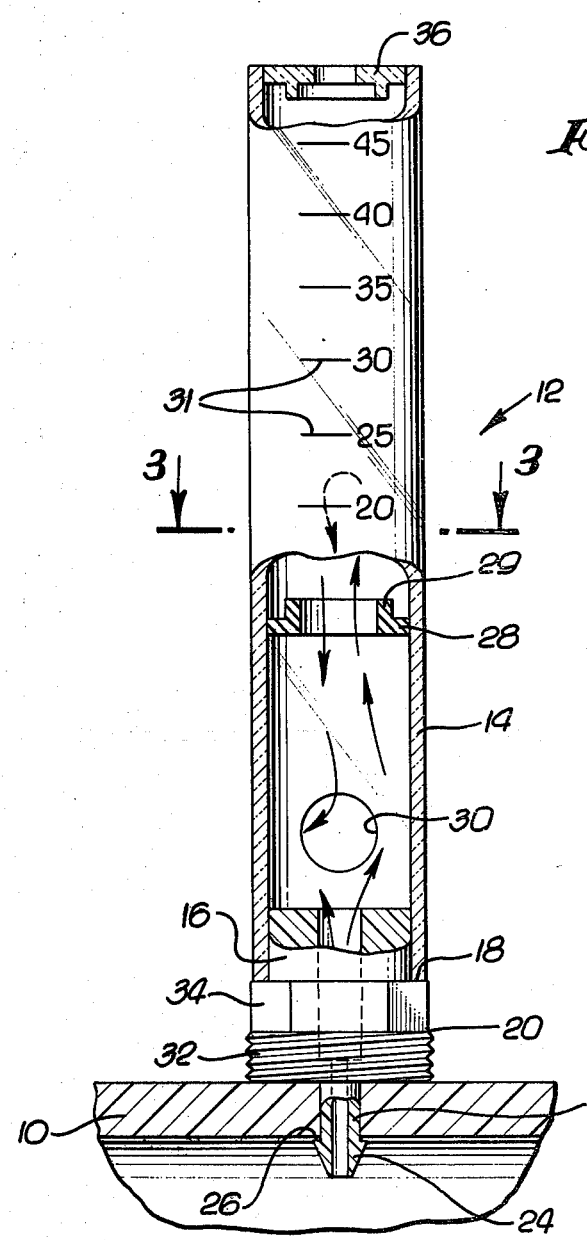
FIG. 2 is an enlarged axial sectional view of the pressure gauge, and taken along a plane corresponding to lines 2—2 of FIG. 1.
Figure 3:
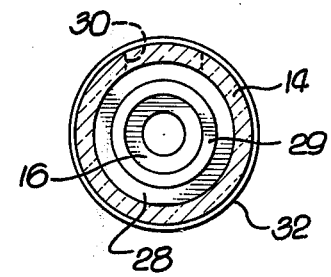
FIG. 3 is a sectional view taken along a plane corresponding to line 3—3 of FIG. 2.

In FIG. 1 a system is illustrated including flexible conduit 10 for a drip irrigation. The conduit 10 may be polyvinyl plastic provided with ⅜" hose fittings. The inventive gauge 12 is installed upstream of the valve 13 that controls flow to the trunk part of the conduit 10.

The gauge 12 comprises a translucent plastic vessel or tube 14 closed at one end by a resilent, but relatively rigid plastic plug 16. The tube seats against a shoulder 18 formed at the base of a slightly enlarged outer end 20 of the plug 16. The plug 16 has a hollow prong or probe 22 terminating at a barbed end 24. The prong is sufficiently pointed as to be capable of piercing the wall of the conduit 10 upon exertion of moderate force. The barbed end 24 terminates in a rearwardly facing shoulder 26 over which the wall of the conduit 10 snaps in order to lock the probe in position.

When the gauge is in place, it is maintained substantially in right angle relationship to the conduit 10 by reason of the fact that the shank part of the prong or probe is only slightly greater than the thickness of the conduit. The enlarged end 20 of the plug 16 stabilizes the gauge.

The pressure of water in the conduit sends a small stream through th prong, through the plug 16 and into the hollow interior of the gauge vessel 14. A centrally apertured baffle ring 28 modulates the flow. Water rises above the baffle to the upper part of the gauge. Water exits via an outlet port 30 located near the inner end of the plug 16. The level of water in the gauge reaches an equilibrium point in accordance with water pressure. The higher the pressure, the greater the inflow of water, the higher the water level in the gauge and the higher is the head of water causing flow outwardly of the port. The level of water is measured by side markings 31 etched, printed or attached to the tube. The size of the port 30 is carefully calibrated so that a sufficient restriction is imposed upon the outflow of water. The port 30 must not be so small as to cause the gauge to be completely flooded for wide ranges of water pressure.

The baffle ring 28 is found to be necessary. It may take a variety of forms. In the present instance, the ring 28 is made of rubber like material with an outside diameter slightly greater than the inside diameter of the gauge tube 14 so that it can be positioned fractionally. The baffle ring 28 in the present instance has a neck 29 that surrounds the baffle orifice.

The gauge can easily be pulled outwardly from the conduit. The hole or slit is virtually self-sealing, but a patch can be used if desired. Instead of puncturing the conduit, the gauge can be installed at a T-fitting as by the aid of hose threads 32 formed about the enlarged end 20 of the plug. A hexagonal part 34 is provided at the base of the threads 32 to facilitate installation of the gauge at a T-fitting.

The end of the tube 14 opposite the plug 16 is partially closed by a ported cap 36 that maybe solvent welded in place.

Intending to claim all novel, useful and unobvious features shown or described, I make the following claims:

1. An agricultural water gauge comprising:
   (a) a vessel;
   (b) means forming a prong at one end of the vessel capable of penetrating the wall of a flexible conduit for relatively restricted bypass flow of fluid from the conduit to the interior of the vessel;
   (c) said vessel being open to atmosphere at its upper end and being sized to receive water from said conduit as the vessel is oriented vertically with said prong lowermost;
   (d) said vessel having a bleed port adjacent said prong end thereof and through which water exits at a rate corresponding to the height of water above said bleed port; and
   (e) gauge markings on the vessel for measuring the height of liquid therein, and correspondingly, the pressure of water in said conduit.

2. In an agricultural water gauge:
(a) a translucent open ended tube;
(b) a plug fitted to one end of the tube and made of relatively rigid material;
(c) said plug having a hollow prong at its outer end capable of piercing a flexible water conduit to form a lateral restricted bypass therefrom;
(d) said hollow prong communicating with the interior of said tube via a longitudinal conduit in said plug;
(e) bleed port in said tube and located adjacent the said one tube end and through which water flows at a rate corresponding to the height of water above the bleed port;
(f) indicator markings on the tube for notation of the level of water therein; and
(g) said gauge being entirely free of moving parts.

3. The gauge as set forth in claim 1 together with means for stabilizing the gauge in vertical position upon said water conduit.

4. The gauge as set forth in claim 1 together with means stabilizing the gauge in vertical position upon the water conduit, including a barbed end of said prong and a shank part of said prong the thickness of which only slightly exceeds the water thickness of the conduit pierced by the probe.

5. The gauge as set forth in claim 1 together with a baffle located intermediate the length of said translucent tube.

6. The gauge as set forth in claim 4 together with a baffle located intermediate the length of said translucent tube and made of resilient material for frictional placement thereof in said tube, said outlet port and said plug both being located on the said side of said baffle.

7. In an irrigation system having a distribution conduit, the combination therewith of:
(a) a vessel supported in a substantially upright position, said vessel being open at its upper end;
(b) means forming a passage for restricted communication between the conduit and the bottom of the vessel for rise of water in the vessel in accordance with the pressure of water in the conduit;
(c) a means forming a bleed orifice from the bottom of the vessel to limit the rise of water in the vessel while maintaining proportionality between pressure in the conduit and height of water in the vessel; and
(d) gauge markings for sighting the height of water in the vessel and, corresponding, the flow characteristics of water in said conduit.

8. The combination as set forth in claim 7 in which said vessel is provided with a hollow prong at its lower end, to provide said restricted communication, said conduit being flexible and capable of being pierced by said prong, said prong attaching said vessel to said conduit and thereby mounting said vessel in a substantially upright position.

9. The combination as set forth in claim 8 in which said vessel has pipe threads at its bottom surrounding said prong for alternate attachment and mounting of said vessel to corresponding threaded parts of said conduit.

* * * * *